July 27, 1926.  1,594,235
E. A. ARNDT
TIRE AND LUGGAGE CARRIER
Filed August 21, 1925   2 Sheets-Sheet 1
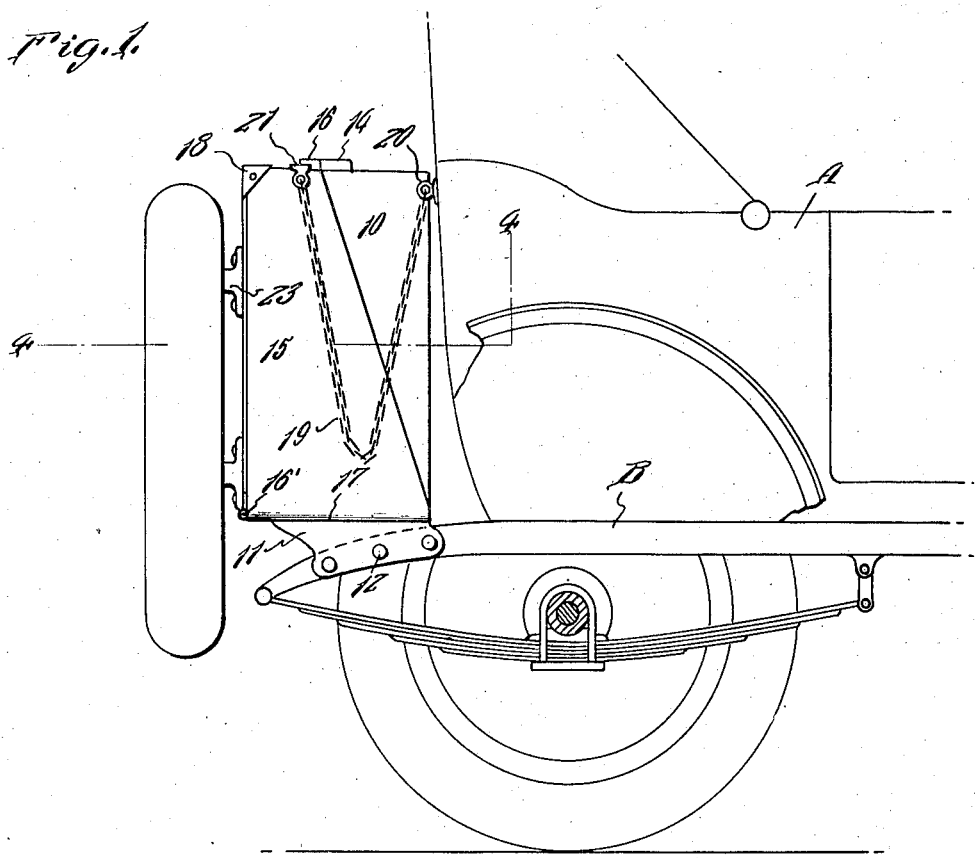
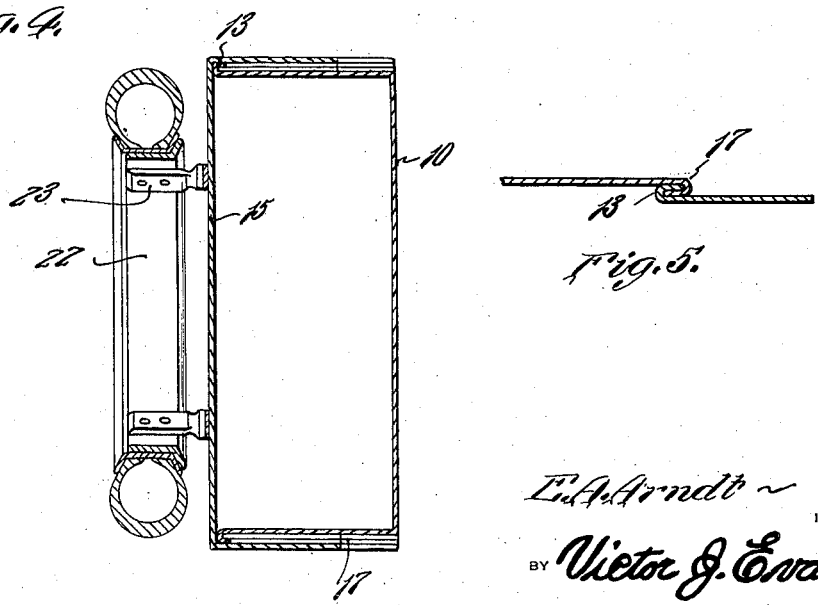
WITNESS:
INVENTOR
E. A. Arndt
BY Victor J. Evans
ATTORNEY July 27, 1926.
E. A. ARNDT
TIRE AND LUGGAGE CARRIER
Filed August 21 1925
1,594,235
2 Sheets-Sheet 2
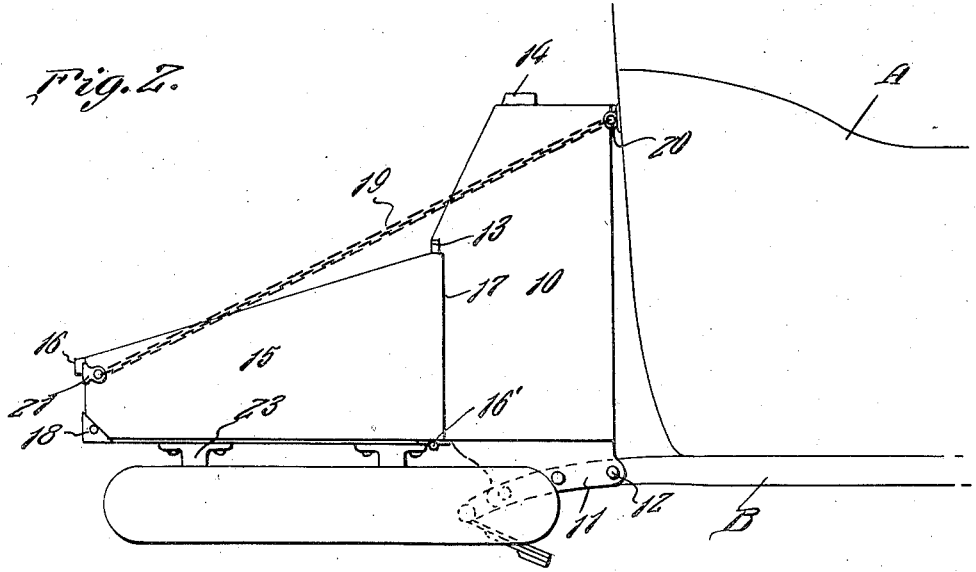
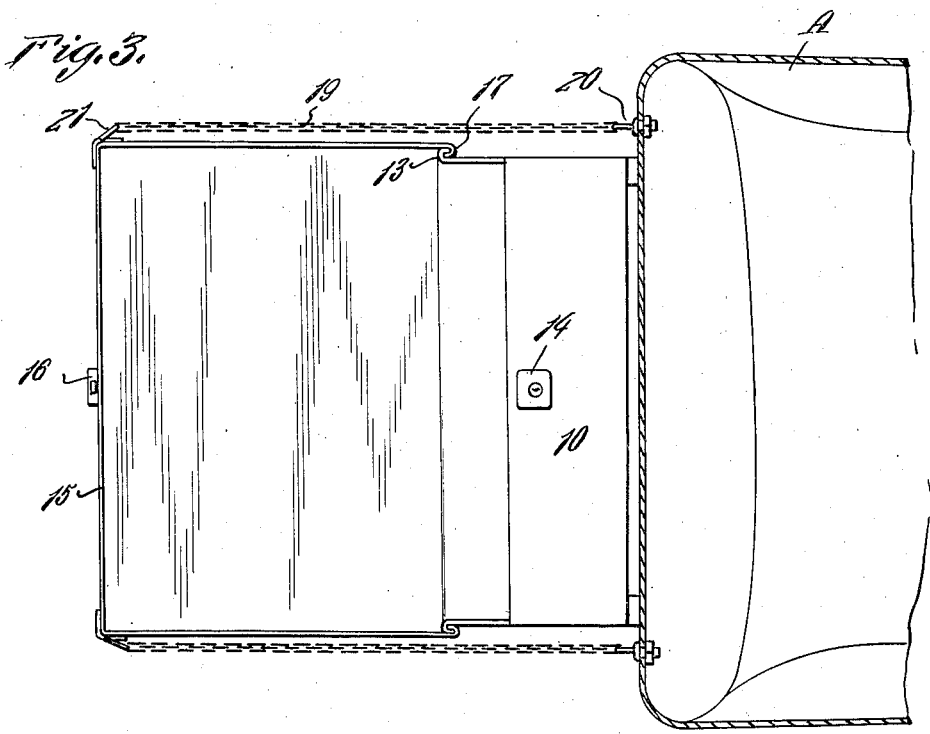
INVENTOR
E. A. Arndt
BY Victor J. Evans
ATTORNEY
WITNESS:

Patented July 27, 1926.

1,594,235

UNITED STATES PATENT OFFICE.

ERNEST A. ARNDT, OF WRAY, COLORADO.

TIRE AND LUGGAGE CARRIER.

REISSUED

Application filed August 21, 1925. Serial No. 51,621.

This invention relates to auxiliary devices used in connection with motor vehicles and the like and has for its object the provision of a novel combined tire carrier and trunk or luggage carrier, the construction and arrangement being such that the device may be bolted onto the frame of the vehicle and consequently held rigidly in proper position, the trunk structure being of such formation as to be capable of being opened up to provide a large storage capacity for carrying suit cases or other auxiliary devices for merchandise or the like.

An important object is the provision of a device of this character in which the luggage carrier is directly mounted on the vehicle frame with the tire-carrier mounted on the trunk or luggage carrier, the arrangement being such that there will be no interference between the two.

Another object is to provide a device of this character in which the trunk may be used as such to contain articles or opened up so as to carry auxiliary receptacles.

An additional object is the provision of a device of this character which will be simple and inexpensive in manufacture, easy to install, positive in action, efficient and durable in service, and a general improvement in the art.

With the above and other objects and advantages in view, the invention consists in the details of construction, the arrangement and combination of parts to be hereinafter more fully described and claimed, and illustrated in the accompanying drawings, in which:

Figure 1 is a side elevation of the device in applied position upon the motor vehicle, the trunk being in closed position.

Figure 2 is a similar view with the trunk thrown into open position to act as a luggage carrier.

Figure 3 is a plan view.

Figure 4 is a cross section taken on line 4—4 of Figure 1, and

Figure 5 is a detail view showing the coacting means on the sections of the trunk for limiting opening movement.

Referring more particularly to the drawings, the letter A designates a portion of a motor vehicle including the usual chassis of which the frame bars B form a part. In carrying out the invention, I provide a trunk structure including a relatively stationary section 10 formed preferably of sheet metal and provided at its lower portion with extensions 11 adapted to be bolted, riveted or otherwise secured onto the frame bars B as indicated at 12. This section 10 is closed except at its front which is of course left open and formed at the side edges of this open front are reversely or rearwardly extending flanges 13 for a purpose to be described. Mounted at the top of this section is a suitable lock device 14 of any ordinary or preferred type.

Cooperating with the relatively stationary section 10 is a relatively movable section 15 which is likewise of sheet metal formation and closed at all sides except one, namely the one disposed ordinarily toward the open front of the section 10. This section 15 is pivotally connected with the section 10 by means of a suitable hinge or other pivotal mounting 16' and carries a hasp or other lock element 16 adapted to cooperate with the lock 14 whereby the two sections may be locked in closed position to define what may be called a trunk. The lower end of the section 15 is likewise open and formed with reversely or rearwardly extending flanges 17 which cooperate with the above described flanges 13 to limit the swinging movement of the section 15 with respect to the section 10 as clearly indicated in the drawings, particularly Figure 3. Obviously, any reinforcing means desired for the corners or other parts of the sections may be provided such as that indicated at 18.

For limiting the swinging movement of the section 15 with respect to the section 10, use may be made of two or more chains or other flexible members indicated at 19 connected at one end with eye bolts or the like 20 secured to the rear of the vehicle body and connected at their other ends with brackets or ears 21 carried by the top portion of the section 15 as clearly indicated in the drawings. Obviously, when the section 15 is in upright position cooperating with the section 10, to define a trunk it is clear that the chains 19 will be slack, whereas, when the section 15 is swung downwardly into horizontal position as shown in Figure 2 the chains will be taut and will operate to brace and support the section 15 so that undue strain will not come upon the hinges or other pivots 16'.

As an added convenience, I may provide a rim 22 mounted upon brackets 23 secured to the main wall of the section 15, this rim being of such formation as to be capable of holding a spare tire thereon either with or without being attached to a rim itself.

In the use of the device it is of course apparent that the tire carrier is used in exactly the same manner as is ordinarily customary. It is also to be noted that when the section 15 is in upright position it will cooperate with the section 10 to define a trunk within which various articles may be stored for transportation purposes. Furthermore, by unlocking the device and permitting the section 15 to swing downwardly into the horizontal position shown in Figures 2 and 3 it is obvious that suit cases, boxes, trunks or other articles may be carried, the device then operating as a luggage carrier instead of constituting merely a trunk itself.

From the foregoing description and a study of the drawings, it will be apparent that I have thus provided a very simple and inexpensive device for the purpose specified. It is believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention, or the scope of the subjoined claim.

Having thus described the invention, I claim:

A device of the character described comprising a relatively stationary section provided with extensions adapted to be mounted upon the frame bars of a vehicle, said section having its rear side open and formed at its side edges with reversely extending flanges, a relatively movable section hinged upon the lower portion of said first named section and having one side and one end open, the open end being provided with flanges cooperating with said first named flanges for limiting swinging movement, and flexible members connected with the vehicle and with the free end portion of the second named section for limiting opening movement.

In testimony whereof I affix my signature.

ERNEST A. ARNDT.